United States Patent [19]

Nagy

[11] Patent Number: 4,872,720
[45] Date of Patent: Oct. 10, 1989

[54] TRUCK BED LINERS

[76] Inventor: Neil F. Nagy, 1310 Park Western Dr., #159, San Pedro, Calif. 90731

[21] Appl. No.: 121,518

[22] Filed: Nov. 17, 1987

[51] Int. Cl.$^4$ .............................................. B62D 33/00
[52] U.S. Cl. ................................................... 296/39.1
[58] Field of Search ................ 296/39 R; 224/42.42 R

[56] References Cited

U.S. PATENT DOCUMENTS

| 4,336,963 | 6/1982 | Nix et al. | 296/37 R |
| 4,572,568 | 2/1986 | Kapp et al. | 296/39 R |
| 4,693,507 | 9/1987 | Dresen et al. | 296/39 R |
| 4,740,027 | 4/1988 | Ormiston | 296/39 R |
| 4,752,097 | 6/1988 | Van Kirk et al. | 296/39 R |

Primary Examiner—Robert R. Song
Attorney, Agent, or Firm—Blakely, Sokoloff, Taylor & Zafman

[57] ABSTRACT

Truck bed liners for pick-up trucks having the characteristics of railer type liners but not extending over the rail of the bed are disclosed. The liners consist of one piece plastic members having a bottom panel formed to receive the wheel wells in the truck bed, a front panel formed to lie substantially against the front wall of the truck bed, and substantially parallel side walls. The region adjacent the top of the side walls extends outward at an elevation just below the side rails of the truck bed, preferably extending to the local side wall of the truck bed for lateral support therefrom. The resulting truck bed liner defines a substantially rectangular cargo carrying platform interrupted of course as required by the wheel wells, without the liner extending over the rails of the truck bed. By giving the outer surfaces of the substantially parallel side walls of the liner a separation approximately equal to the separation between the rails of the truck bed, the liner will define a carrying platform slightly narrower than the unlined truck bed, thereby preventing most loads from hitting the side of the truck bed rails and thus avoiding abuse of the finish thereon. Such spacing also allows the liner of the present invention to be made using tooling which can also be used to make a corresponding conventional railer type liner by adding removable side pieces to the mold.

10 Claims, 3 Drawing Sheets

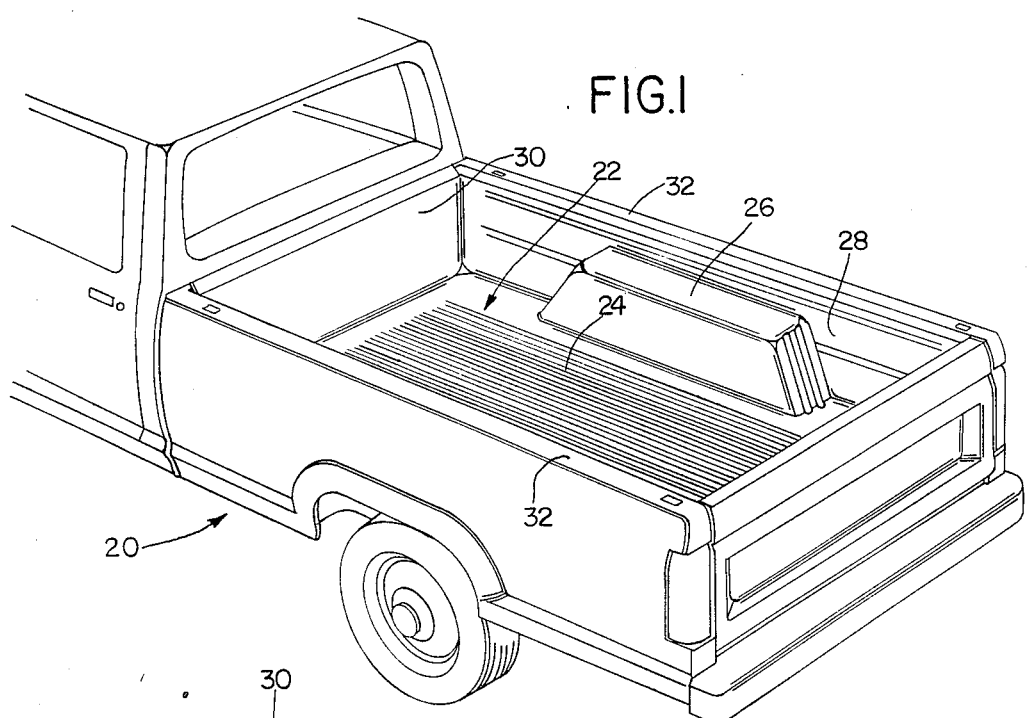
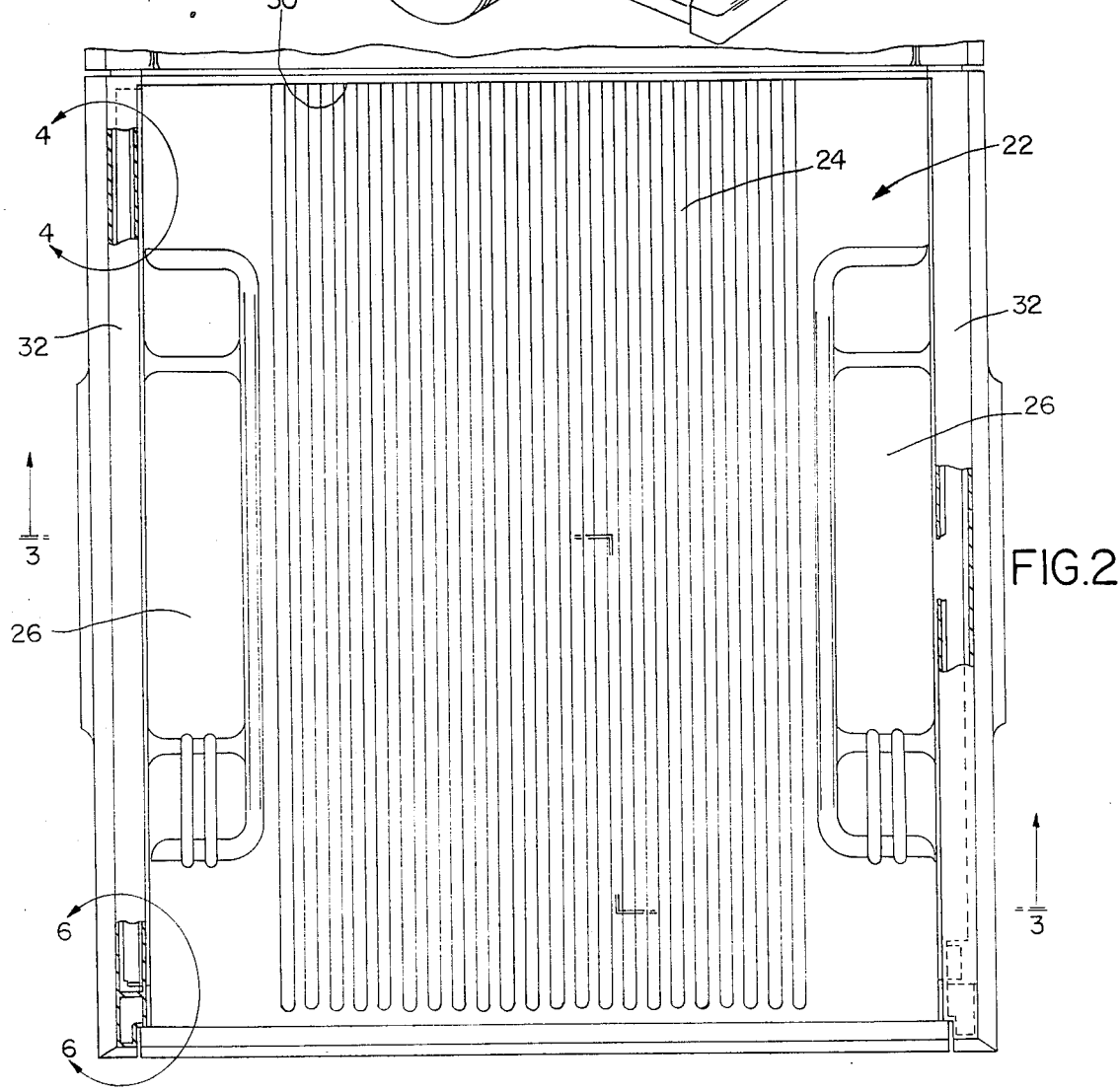

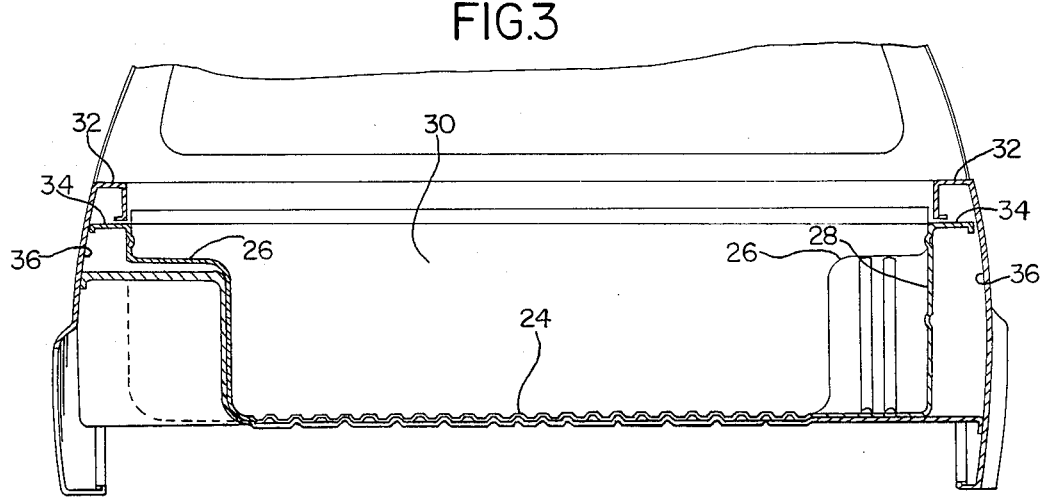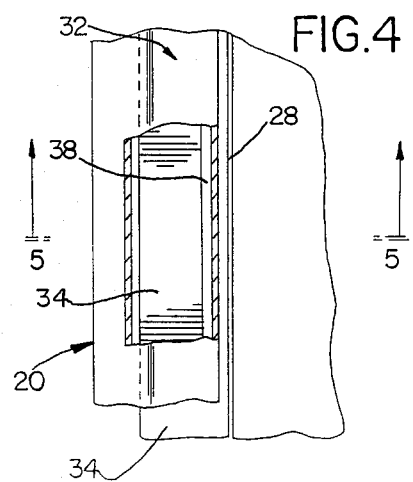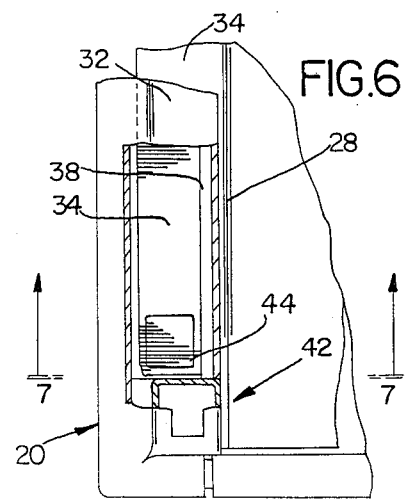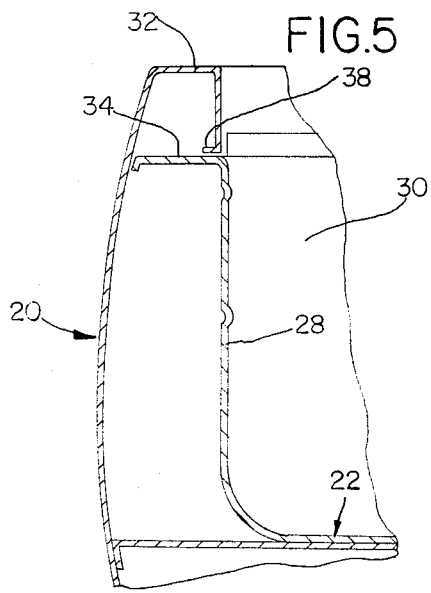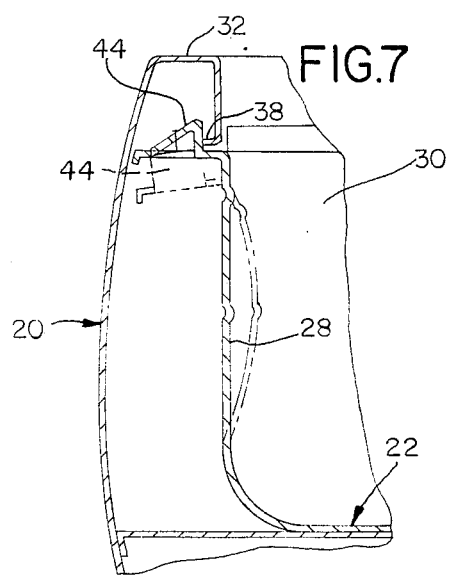

TRUCK BED LINERS

BACKGROUND OF THE INVENTION

1. Field of the Invention

The present invention relates to the field of bed liners for pick-up trucks.

2. Prior Art

In recent years pick-up trucks of various sizes and configurations have been used in increasing numbers for individual and family vehicles, or at least in part as individual and family vehicles, because of their convenience and usefulness in towing boats and trailers, in carrying campers, motorcycles and other recreational vehicles, and because of their overall utility and general appeal. As a result, there is an increasing desired among pick-up truck owners to keep the vehicle in good condition and to add accessories which will distinguish the same from the average pick-up truck. One accessory which has found increasing popularity is the truck bed liner which can enhance the appearance of the truck bed and which will provide protection thereto against dents, chipped paint, rusting, etc. These truck bed liners are generally vacuum formed from an appropriate relatively tough plastic to fit within and be fastened to the truck bed so that at least major contact between articles being carried is between the article and the truck bed liner, rather than between the article and the truck bed itself.

Truck bed liners are generally commercially available in either of two forms. One form of truck bed liner, referred to as a railer, defines a generally rectangular box-like carrying platform interrupted by the wheel wells of the truck bed, with the side walls of the railer extending upward over the side rails of the truck bed and flairing outward thereover. As such, a railer gives the truck bed a more finished appearance while at the same time providing protection not only for the bottom and side walls of the truck bed, but also providing protection for the top of the rails of the truck bed. Examples of such railers may be found in U.S. Pat. Nos. 3,814,473, 4,161,335, 4,181,349, and 4,336,963.

While railers are both practical and aesthetically pleasing, in certain applications they are not preferred. In particular, people who use their pick-up trucks for carrying campers in general do not want the camper resting on the outward extending flanges covering the rails of the truck bed. Accordingly, while railers probably provide the best truck bed protection for many applications and at the same time are probably most aesthetically pleasing, occasional use of the pick-up truck to carry a camper, as is reasonably common, will usually preclude the sale of a railer to the truck owner.

Another type of truck bed liner, referred to simply as a liner, consists of a member formed with wheel well recesses to lie against the bottom and front wall of the truck bed, and curving outward at the sides thereof to approximately conform to the side walls of the truck bed, terminating at an elevation below the rails thereof and with a separation so as to extend well under the rails. As such, the liner will protect the bottom and side walls of the truck bed when carrying cargo such as sand or gravel, but will not provide significant protection for the rails thereof when carrying many other types of cargo. Also, liners usually are not as aesthetically pleasing as railers because of their lack of a well defined geometric cargo carrying platform shape of railers. They are however, suitable for use with campers, as they do not cover the rails of the truck bed.

It is therefor one of the objects of the present invention to provide a truck bed liner having most of the advantages of conventional railers, but which can be used in applications not compatible with a truck bed liner extending over the rails of the vehicle.

BRIEF SUMMARY OF THE INVENTION

Truck bed liners for pick-up trucks having the characteristics of railer type liners but not extending over the rail of the bed are disclosed. The liners consist of one piece plastic members having a bottom panel formed to receive the wheel wells in the truck bed, a front panel formed to lie substantially against the front wall of the truck bed, and substantially parallel side walls. The region adjacent the top of the side walls extends outward at an elevation just below the side rails of the truck bed, preferably extending to the local side wall of the truck bed for lateral support therefrom. The resulting truck bed liner defines a substantially rectangular cargo carrying platform interrupted of course as required by the wheel wells, without the liner extending over the rails of the truck bed. By giving the outer surfaces of the substantially parallel side walls of the liner a separation approximately equal to the separation between the rails of the truck bed, the liner will define a carrying platform slightly narrower than the unlined truck bed, thereby preventing most loads from hitting the side of the truck bed rails and thus avoiding abuse of the finish thereon. Such spacing also allows the liner of the present invention to be made using tooling which can also be used to make a corresponding conventional railer type liner by adding removable side pieces to the mold.

BRIEF DESCRIPTION OF THE DRAWINGS

FIG. 1 is a rear perspective view of a typical pickup truck illustrating one embodiment of the present invention installed therein.

FIG. 2 is a top view of the truck bed liner and associated truck bed of FIG. 1.

FIG. 3 is a cross-section taken along line 3—3 of FIG. 2.

FIG. 4 is a view taken along line 4—4 of FIG. 2.

FIG. 5 is a cross-section taken along line 5—5 of FIG. 4.

FIG. 6 is a view taken along line 6—6 of FIG. 2.

FIG. 7 is a cross-section taken along line 7—7 of FIG. 6.

DESCRIPTION OF THE INVENTION

Figure 8:
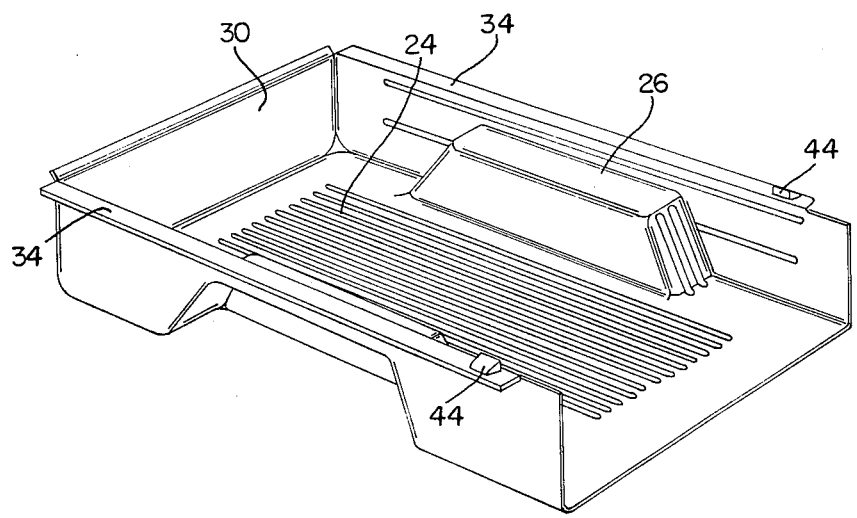
FIG. 8 is a perspective view of the truck bed liner of FIG. 1.

First referring to FIG. 1, a perspective view of the aft portion of a pick-up truck, generally indicated by the numeral 20, with the present invention truck bed liner, generally indicated by the numeral 22 may be seen. The truck bed liner 22 is a one piece vacuum formed plastic member having a bottom panel 24 formed in wheel well regions 26 to fit over the wheel wells of the truck bed, and integral side panels 28 and front panel 30. As may be seen in FIG. 1, the side panels 28 do not extend over the side rails 32 of the truck bed, leaving the side rails unobstructed. Otherwise the truck bed liner appears much like conventional railers, defining a substantially rectangular cargo box significantly interrupted only by the provisions for the wheel wells of the truck bed.

FIG. 2 shows a top view of the truck bed liner of FIG. 1, with various sections being taken therethrough as shown in the later figures. By way of example, section 3—3 is a broken section taken through the left fender well as viewed in FIG. 2, and through the right side of the truck bed and liner forward of the fender well. As may be seen in FIG. 3, the bottom panel 24 of the liner is ribbed to provide increased rigidity thereto, otherwise generally lying flat on the bottom wall of the truck bed. The bottom panel 24 is generally formed in regions 26 to accommodate the wheel wells on the truck bed, and may generally conform in shape thereto or alternatively, may be somewhat longer and more geometric in shape as desired. In the particular embodiment illustrated, th aft portion of regions 26 is ribbed for improved rigidity and appearance.

As may be seen in FIG. 3, the side walls 28 of the truck bed liner (the left side wall being relatively short, as shown in that figure, because of the wheel well immediately thereunder) are substantially parallel side walls, each of which terminates below the lower portion of truck bed rails 32. The upper portion of each of side walls 28 projects outward to what normally forms the side wall 36 of the truck bed so as to be supported thereby to prevent substantial side deflection of the upper portion of the side walls of the truck bed liner. This general configuration extends over substantially the entire length of the truck bed liner, such as well fore and aft of each wheel well, as may be seen in FIGS. 5 and 7 which are cross-sections taken along lines 5—5 and 7—7 of FIGS. 4 and 6, respectively, which in turn are sections taken on an expanded scale on lines 4—4 and 6—6 of FIG. 2. Thus, by way of example, it may be seen in FIG. 5 that the flanged region 34 of the truck bed liner extends substantially horizontal just under the lower lip 38 of the side rail 32 of the truck bed.

Also, as may be seen in FIG. 5, the outer surface 40 of the side wall 28 preferably is substantially parallel to or slightly inward of the truck bed side rail 32. This has two advantageous effects. First, this positions the inner surface of the side panel 28 of the truck bed liner inward of the side of the truck bed rail 32, so that items with substantially parallel sides such as crates and the like will be held away from the side rails 32 of the truck bed, and therefore the side rails will not be marred, scratched, etc. thereby, even though the truck bed liner does not cover the truck bed side rails. This can very substantially reduce the wear and tear on the truck bed side rails in comparison to a liner having an inner wall parallel to the side surface of the side rail, or positioned thereunder. The positioning of the side panel 28 of the truck bed liner slightly inward, as shown in FIG. 5 as well as the other figures, including FIGS. 3 and 7, also has the manufacturing advantage that one can make a mold with removable side pieces to manufacture the truck bed liner of the present invention, or alternatively to manufacture a conventional railer type truck bed liner by merely putting the removable side pieces on the mold to effectively raise and reproportion the horizontal flanges at the top of the truck bed liner sides to fit over the side rails 32 of the truck bed.

At the very rear of the truck bed liner, the side flanges 34 will in general terminate just short of the enclosure containing the tail light wiring, etc., which configuration may vary considerably from manufacturer to manufacturer. In general, because the truck bed liner of the present invention fits over the wheel wells of the truck bed and fits under the side rails 32 thereof, the truck bed liner is well retained and cannot inadvertently come loose. Accordingly, it is not necessary for the truck bed liner of the present invention to be fastened to the truck bed for retention purposes. However, it is desireable to provide some retention toward the upper edges of the side panels near the rear of the truck bed liner to prevent the rear portion of the side panels, particularly the upper rear portion thereof, from bending inward either naturally or by something getting between that region of the side and the side wall of the truck bed, or by being hit and encouraged inward during loading through the tailgate, particularly when heat has softened the material. For this purpose, one or more screws could be placed through the upper side wall of the truck bed liner in region 42 (see FIG. 6) into the enclosure containing the tail light. However, in the preferred embodiment a wedge shaped protrusion 44 is formed in the aft portion of each of flanges 34 for projecting upward behind the flanges 38 on the side rail 32 of the truck body. These protrusions provide a positive retention of the upper aft side panel region of the truck bed liner as an integral part of the one piece vacuum formed truck bed liner to allow the truck bed liner to be manually deflected for snaping into position on the pick-up truck bed for which it was designed, and to be positively retained therein without any extra fasteners, without drilling any holes into the truck body or otherwise altering the same in any way. This of course is a big advantage over many prior art truck bed liners, as there is a natural resistence by pick-up truck owners to drill holes, etc., in a new truck regardless of the purposes thereof. It also allows the liner to be removed when desired without tools and without leaving holes, mounted members, etc., on the truck bed.

The front panel 30 of the truck bed liner of the present invention is of course generally configured to conform, except for ribbing, to the front wall of the truck bed of the pick-up truck for which it was designed, preferably also not extending over the top of the front wall, though deflecting forward or aft as appropriate to conform to all but the top of the front wall.

Figure 9:
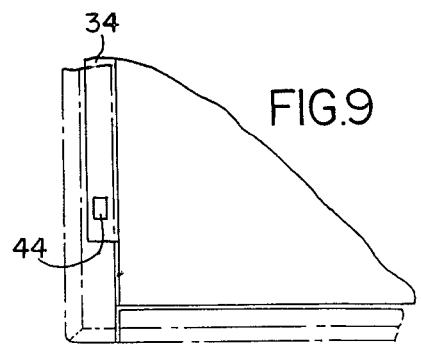
FIGS. 9, 10, and 11 are top views of the left rear corner of a truck bed liner, with the corresponding truck bed shown in phantom, for domestic pick-up trucks, mini pick-up trucks and imported pick-up trucks, respectively.
Figure 10:
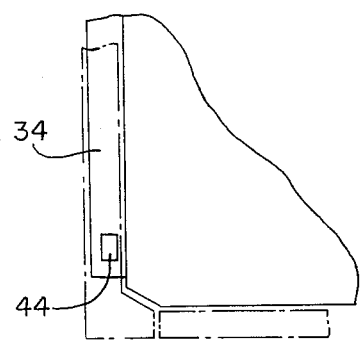
Figure 11:
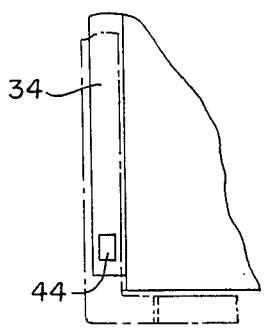

In many cases the front panel 30 of the truck bed liner will extend to an elevation higher or lower than the side flanges 34 thereof. This may be seen in FIG. 8, which is a perspective view of a typical truck bed liner in accordance with the preferred embodiment of the present invention. In that regard, the position of the protrusions 44, shown therein relative to the back of the truck bed liner, will vary dependent upon the design of the particular truck, with the position of the protrusions 44 for domestic pick-up trucks, mini pick-up trucks, and import pick-up trucks being illustrated on a relative basis in FIGS. 9 through 11.

Of course, while the preferred embodiment of the present invention uses only a single protrusion 44 at the rear of each side flange 34, obviously additional upward projecting members such as protrusions 44 or other upward projecting members may be located at other positions along flanges 34 as desired. By way of specific example, while a one piece construction of the truck bed liner is preferred, one could attach a plastic wedge or other suitable device to the flange by screws, solvent welding or the like, to achieve the same purpose. Such additional pieces would still allow the installation of the truck bed liner without any clamps onto or screws into the truck bed being required, and would keep the mold, particularly the top surface thereof, a simple flat surface, to more readily facilitate the typical vacuum forming manufacturing operation. One could also use a simple upward projecting tab at the rear of each flange 34 for this purpose.

Thus, while the preferred embodiment of the present invention has been disclosed and described in detail herein, it will be understood by those skilled in the art that various changes in form and detail may be made therein without departing from the spirit and scope thereof.

I claim:

1. A liner for a truck bed of the type having a substantially horizontal bottom wall interrupted by first and second wheel wells, a substantially upright front wall and first and second side walls, the side walls each having an upper rail-like portion substantially parallel to the other rail-like portion and spaced a first predetermined distance therefrom, the side walls also each having a lower portion spaced from the lower portion of the other side wall by a distance exceeding said first predetermined distance, the liner comprising:

a unitary structure comprising a bottom panel having first and second side edges and front and rear edges, a front panel having an upper edge, a lower edge and first and second side edges, and first and second side panels each having an upper edge, a lower edge and front and rear edges, said bottom panel being formed to lie against the bottom wall of a truck bed and over the wheel wells thereon, said bottom panel being integrally joined at said first and second side edges to said lower edges of said first and second side panels, said bottom panel also being integrally joined at said front edge to said lower edge of said front panel, said first and second side panels being integrally joined to said first and second side edges, respectively, of said front panel, said first and second side panels being spaced from each other by a distance approximately equal to said first predetermined distance such that said side panels are substantially flush with the upper rail-like portions of the truck bed, the region of said first and second side panels adjacent the top edge thereof being formed outward at an elevation slightly below the upper rail-like portions of the truck bed to fit thereunder and including means for maintaining the top edge of said first and second side panels spaced apart by approximately said first predetermined distance;

whereby said liner together with the side rails of the truck bed define an approximately rectangular truck bed, as interrupted by the provision in the bottom panel for the wheel wells of the truck.

2. The liner of claim 1 wherein the region of said first and second side panels adjacent the top edge thereof are formed outward to extend under the rail-like portions of the truck bed and to terminate adjacent the corresponding region of said lower portions of the truck bed side walls.

3. The liner of claim 2 wherein said side panels of said liner are spaced from each other by a distance slightly less than said first predetermined distance such that cargos disposed within the truck bed will be held away from the side rails of the truck bed.

4. The liner of claim 3 further comprising retaining means for retaining the region of said side panels adjacent said upper edges thereof in a predetermined separation.

5. The liner of claim 4 wherein said retaining means is a means for retaining the region of said side panels adjacent said upper edges thereof to the rail-like portion of the side walls of the truck bed.

6. The liner of claim 5 wherein said retaining means comprises at least one upward projecting member integrally formed in the region of each said side panel adjacent said upper edge thereof, said upward projecting members being a means for extending upward behind the rail-like portions of the truck bed to retain said side panels with respect thereto.

7. The liner of claim 1 further comprising retaining means for retaining the region of said side panels adjacent said upper edges thereof in a predetermined separation.

8. The liner of claim 7 wherein said retaining means is a means for retaining the region of said side panels adjacent said upper edges thereof to the rail-like portion of the side walls of the truck bed.

9. The liner of claim 8 wherein said retaining means comprises at least one upward projecting member in the region of each said side panel adjacent said upper edge thereof, said upward projecting members being a means for extending upward behind the rail-like portions of the truck bed to retain said side panels with respect thereto.

10. The liner of claim 9 wherein said at least one upward projecting member is integrally formed in the region of each said side panel adjacent said upper edge thereof.

* * * * *